United States Patent [19]

Raidel

[11] 4,132,432
[45] Jan. 2, 1979

[54] AIR RIDE SUSPENSION ASSEMBLIES

[76] Inventor: John E. Raidel, Rte. 9, Box 400-M, Springfield, Mo. 65804

[21] Appl. No.: 728,869

[22] Filed: Oct. 1, 1976

[51] Int. Cl.² .......................................... B60G 11/26
[52] U.S. Cl. .................................................... 280/711
[58] Field of Search .............. 280/702, 705, 709, 712, 280/713, 711

[56] References Cited
U.S. PATENT DOCUMENTS

| | | | |
|---|---|---|---|
| 2,290,620 | 7/1942 | Brown | 280/711 |
| 2,903,256 | 9/1959 | Weiss | 280/711 |
| 2,970,848 | 2/1961 | Rice | 280/711 |

*Primary Examiner*—Richard A. Bertsch
*Attorney, Agent, or Firm*—Rogers, Eilers & Howell

[57] ABSTRACT

A vehicle air suspension assembly consists generally of a hanger and a front and rear air spring depending from the chassis on opposite sides of the hanger. An axle seat assembly attaches to the axle and rigidly extends between the springs. An upper and a lower radius rod are pivotally connected between the hanger and the axle seat assembly and form a parallelogram which supports and stabilizes the axle. The pivotal connections of the radius rods are adjustable to provide accurate axle alignment and pitch in relation to the chassis. A shock absorber extends between the axle seat assembly and the chassis to dampen suspension movement.

17 Claims, 20 Drawing Figures

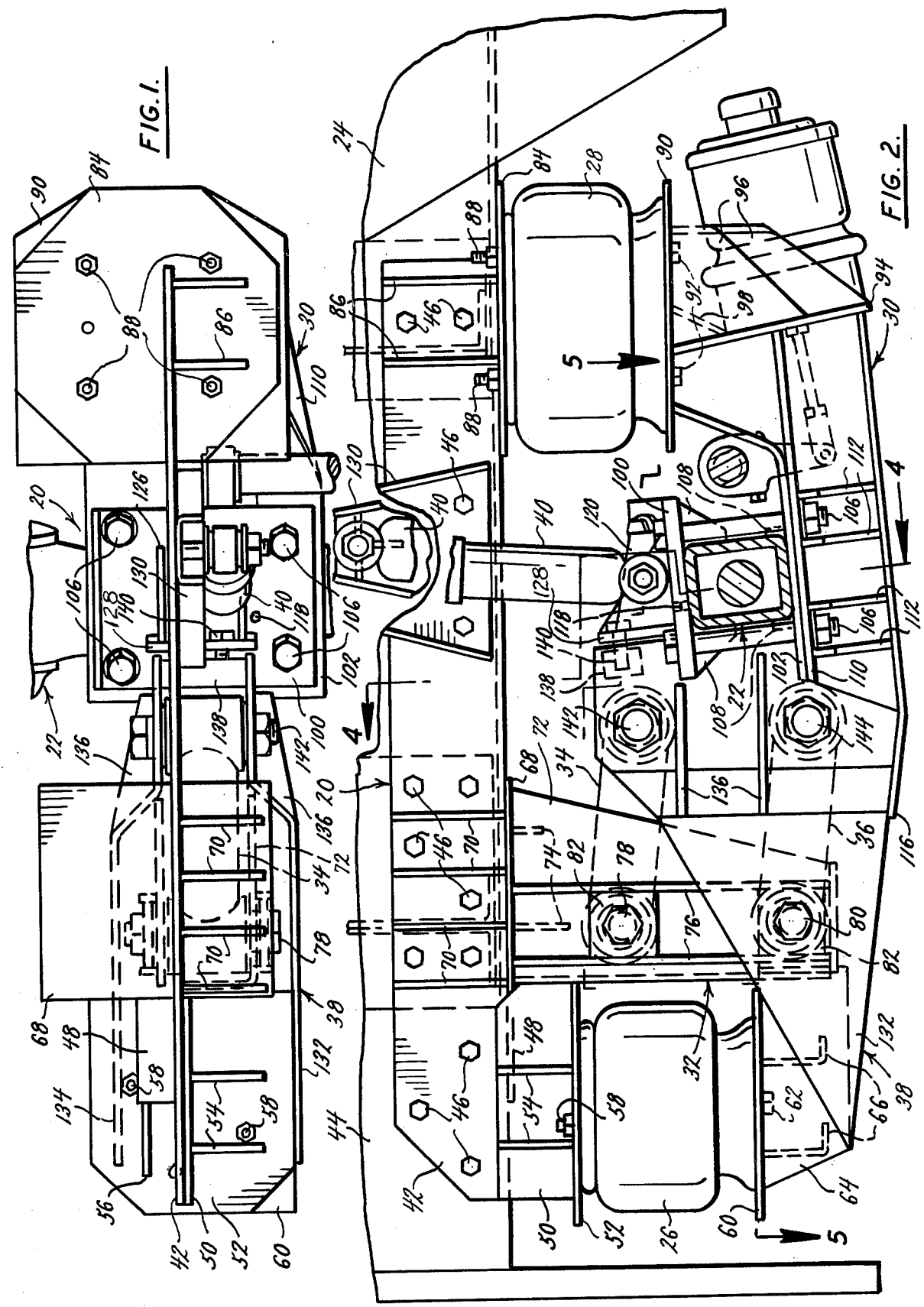

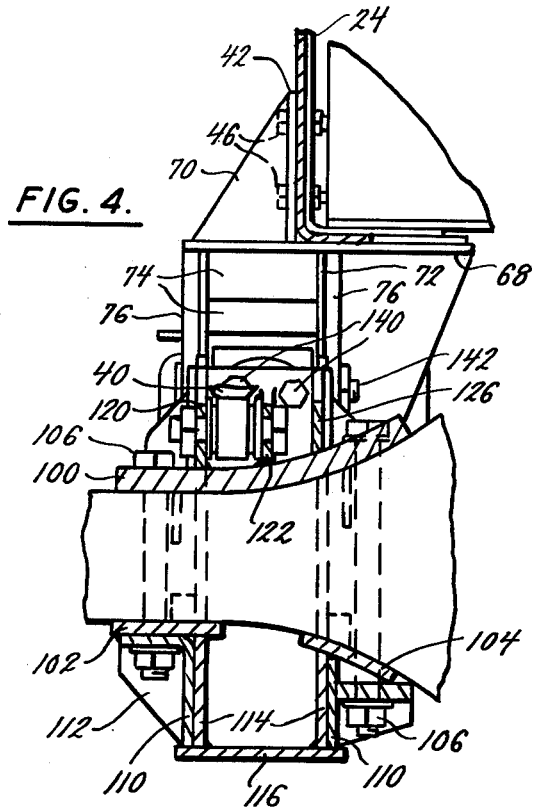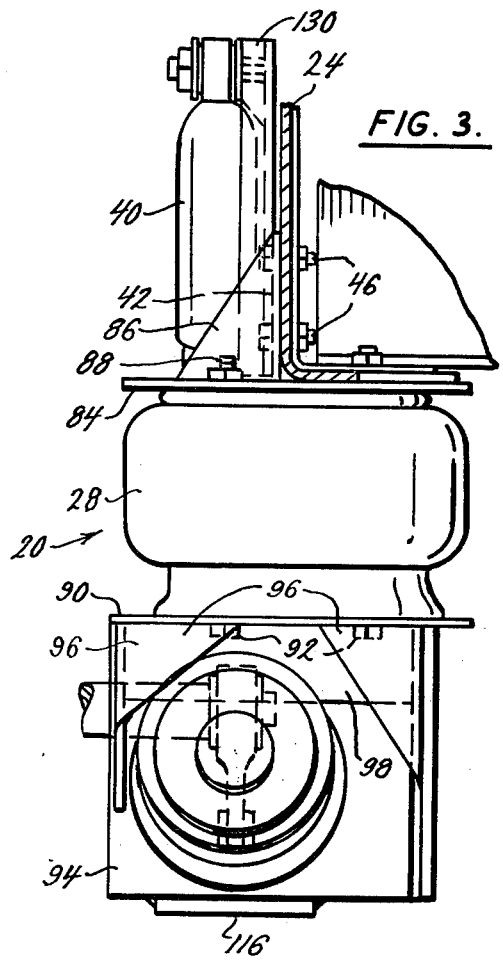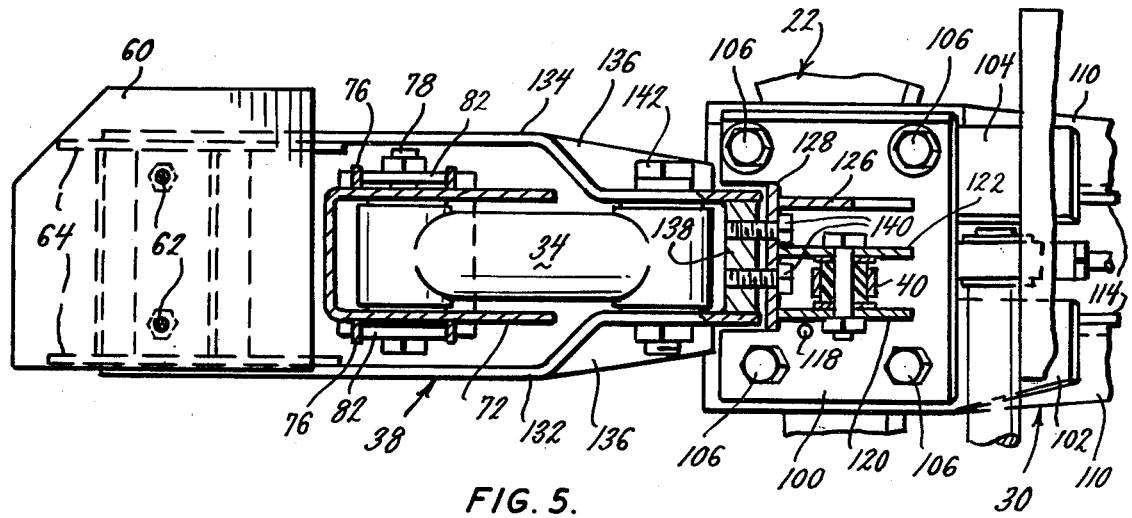

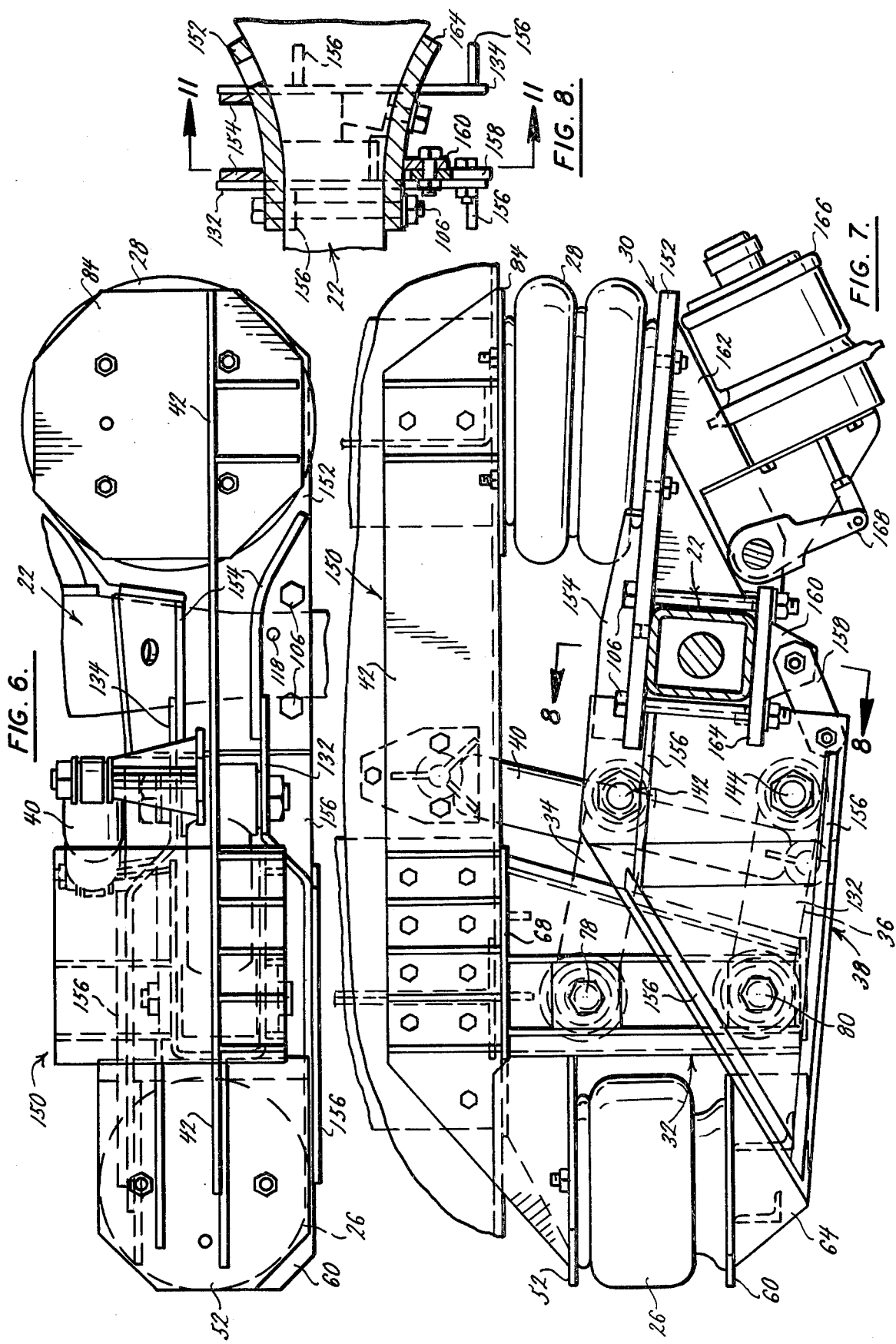

AIR RIDE SUSPENSION ASSEMBLIES

SUMMARY OF THE INVENTION

This invention relates to a suspension assembly for mounting a vehicle chassis to an axle and more specifically to such an assembly wherein the resilient members are air springs and the means for supporting the air springs and axle include a wishbone and parallelogram structure providing for mounting of the air springs fore and aft of a depending hanger.

The suspension assembly generally includes a hanger and a front and rear air spring depending from the chassis fore and aft of the hanger. An axle seat assembly attaches to the axle located rearwardly of the hanger and extends rearward to mount on the free floating end of the rear air spring. A wishbone assembly attaches to the axle seat assembly and extends forward past the hanger to mount on the free floating end of the front air spring. The hanger extends downward from the chassis between the front air spring and the axle. Two radius rods pivotally connect between the wishbone assembly and the hanger forming a parallelogram to maintain the axle pitch constant. An hydraulic shock mounts between the chassis and the top of the axle seat assembly to dampen axle movement.

Another embodiment of applicant's invention is generally the same as the first but has structural differences to accommodate axles of positive pitch.

Still another embodiment of applicant's invention modifies the suspension system for use with a steering axle, and includes many of the same component parts as used in the previous embodiments which is very desirable from a maintenance standpoint. The structural differences in this embodiment relate to the axle seat assembly and the location of the shock absorber.

Two further embodiments include modifications for use with a different design square axle and axle mount both with and without a central radius rod.

Thus, it is a primary object of this invention to provide an air spring suspension with a wishbone and parallelogram arrangement for supporting a vehicle chassis on an axle, and where the axle pitch can remain constant during loading and unloading of the axle, and where the comfort of air spring ride is combined with a parallelogram support for stability. It is a further object to provide such a suspension which is readily adaptable to various axle pitches and designs. These and other objects of the invention are apparent from the drawing and detailed description to follow.

DESCRIPTION OF THE DRAWINGS

FIG. 1 is a top plan view of a suspension assembly of this invention;

FIG. 2 is a side elevation view of the suspension assembly of FIG. 1;

FIG. 3 is a rear end view of the suspension assembly of FIG. 2;

FIG. 4 is a view in section taken along the line 4—4 of FIG. 2 detailing the axle seat assembly;

FIG. 5 is a view in section taken along the line 5—5 of FIG. 2 detailing the wishbone and axle seat assembly;

FIG. 6 is a top plan view of another embodiment of this invention;

FIG. 7 is a side elevation view of the embodiment of FIG. 6;

FIG. 8 is a section view taken along the line 8—8 of FIG. 7 and details the axle mount assembly;

DETAILED DESCRIPTION OF PREFERRED EMBODIMENTS

Figure 9:
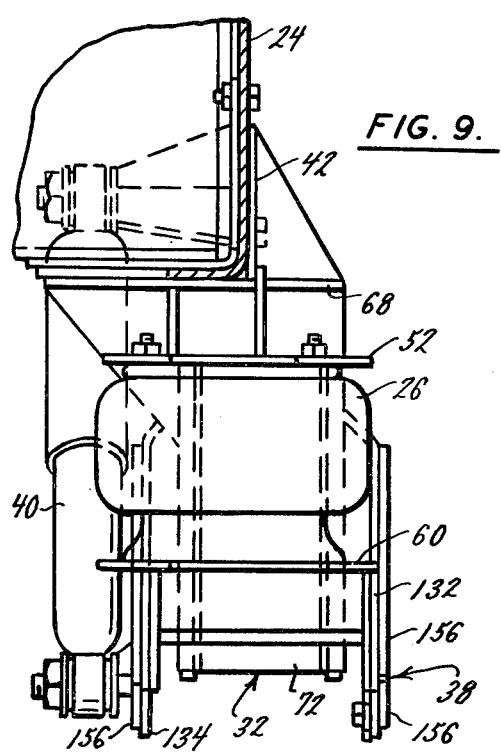
FIG. 9 is a front end view of the embodiment of FIG. 6.
Figure 10:
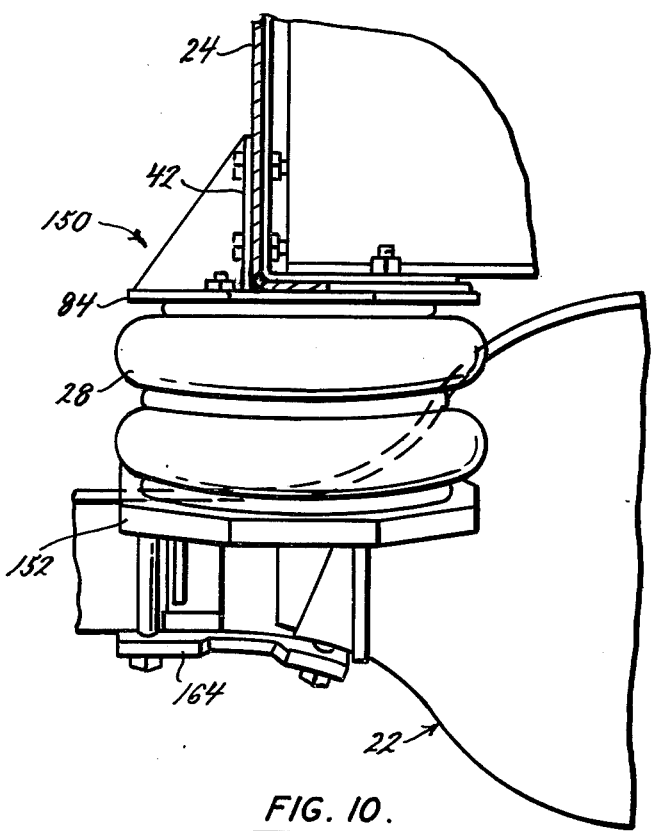
FIG. 10 is a rear end view of the embodiment of FIG. 6.
Figure 11:
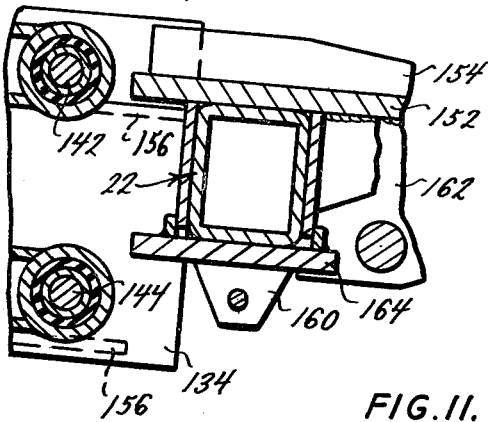
FIG. 11 is a view in section taken along the line 11—11 of FIG. 8 and details the axle mount assembly.

Referring to FIGS. 1 through 5 of the drawing there is shown one embodiment of this invention. The air ride suspension 20 is designed for use on an axle 22 of a vehicle having a chassis 24. Generally, the air ride suspension 20 has a front air spring 26 and a rear air spring 28 which depend from the chassis 24. The rear air spring 28 is bolted to an axle seat assembly 30 which mounts to the vehicle axle 22, securing it thereto. A hanger assembly 32 depends from the vehicle chassis 24 and supports an end of an upper radius rod 34 and a lower radius rod 36. A wishbone bracket assembly 38 extends from the front air spring 26 to the axle seat assembly 30 and provides the mounting for the other ends of the upper radius rod 34 and the lower radius rod 36. An hydraulic shock absorber 40 is mounted between the chassis 24 and the top of the axle seat assembly 30.

The axle 22 is supported by the front air spring 26 and the rear air spring 28 so that as it is loaded, these springs compress to absorb the load. The radius rods 34 and 36 are pivotally connected and serve to stabilize and maintain a constant pitch to the axle 22. The hydraulic shock absorber 40 dampens axle movement.

The suspension assembly 20 consists more particularly of a gusset plate 42 which is mounted to the side frame 44 of the chassis 24 by a plurality of bolts 46. A horizontal plate 48 is welded to the bottom of the gusset plate 42 and extends inboard therefrom. A vertical plate 50 is welded to the front of the gusset plate 42 and extends downwardly therefrom at the forward end. A top plate 52 is welded to the bottom of the vertical plate 50 and is reinforced by reinforcing webs 54 which extend to the vertical plate 50. The top plate 52 is also reinforced by a reinforcing web 56 extending between the top plate 52 and the horizontal plate 48 on the inboard side of the gusset plate 42. The front air spring 26 is bolted to the top plate by a plurality of bolts 58. A bottom plate 60 is similarly attached to the front air spring 26 by a bolt 62. Two vertical brackets 64 extend downwardly from the bottom plate and are reinforced by cross members 66.

The hanger assembly 32 is located rearwardly from the spring 26 and is secured to the gusset plate 42 through a horizontal plate 68 which is reinforced by reinforcing webs 70 extending between it and the gusset plate 42. A U-shaped bracket 72 forms the body of the hanger assembly 32 and extends downward from the horizontal plate 68. Reinforcing cross members 74 are welded between the upper portion of the arms of the "U" to strengthen the bracket 72. Ribs 76 are welded to the inboard and outboard sides of the U-bracket 72 to form a mounting channel. An upper eccentric bushing 78 and a lower eccentric bushing 80 are secured to the U-bracket 72 by clamp assemblies 82. These bushing assemblies 78 and 80 have cams or eccentric bolts for axle alignment and may be of the type shown as item 68 in U.S. Pat. No. 3,801,086, incorporated herein by reference.

The rear air spring 28 is secured to the chassis 24 by a top plate 84 and reinforcing webs 86 which extend to the gusset plate 42. A plurality of bolts 88 attach the air spring 28 to the top plate 84. A bottom plate 90 is secured to the air spring 28 by bolts 92. A back plate 94 extends downwardly from the bottom plate 90 and provides a convenient mounting for an air chamber shown by broken lines. Reinforcing side plates 96 and a reinforcing cross member 98 extend between the bottom plate 90 and the back plate 94 for strength.

The axle seat assembly 30 is located between the hanger assembly 32 and rear air spring 28 and includes a top plate 100 and two bottom brackets 102 and 104 which are secured to the axle 22 by a plurality of bolt assemblies 106. The brackets 102 and 104 curve upwardly at their rear and attach to the bottom plate 90 of the rear air spring 28. Locating ears 108 extend downwardly from the top plate 100 and upwardly from the bottom brackets 102, 104 to help position the axle 22 within the axle seat assembly 30. Beam brackets 110 are secured to the assembly 30 by the axle bolts 106 and extend to the back vertical plate 94. Reinforcing webs 112 extend between the angular sides of the beam brackets 110 and help protect the axle bolts 106. Interior brackets 114 are located inside the beam brackets 110 and extend the length of the axle seat assembly 30. A bottom beam plate 116 extends across the bottom of the axle seat assembly 30 and encloses the area between the interior brackets 114. A dowel pin 118 extends through the top plate 100 into the axle 22 and secures the axle seat assembly 30 from sliding towards the end of the axle 22.

Two vertical brackets 120 and 122 extend upwardly from the top plate 100 to provide a convenient mounting location for the bottom of the hydraulic shock absorber 40. A third vertical bracket 126 extends between the top plate 100 and a connecting bracket 128 which joins an end of all of these vertical brackets 120, 122, and 126 and the top plate 100. The hydraulic shock absorber 40 extends upward and connects to a chassis member. Protective brackets 130 partially enclose the top of the hydraulic shock absorber 40.

Wishbone brackets 132 and 134 extend between the vertical brackets 64 on the front air spring assembly 26 to the axle seat assembly 30. Reinforcing webs 136 strengthen the bend in the bracket at the neck. A bolt block 138 extends between the top of the brackets 132 and 134 and is tapped to receive mounting bolts 140 which extend through the connecting bracket 128 at the top of the axle seat 30 to secure the top of the wishbone brackets 132 and 134 thereto. The bottom of the wishbone brackets are secured to the beam plate 116. Bushing assemblies 142 and 144 extend between the two wishbone brackets 132 and 134 and pivotally connect the upper radius rod 34 and the lower radius rod 36 thereto. Bushing assemblies 142 and 144 may be of the same type as item 108 in U.S. Pat. No. 3,801,086.

Operation

In operation of this embodiment of the invention, a load applied to the axle 22 will cause the axle 22 to move upwardly relative to the chassis 24 against the resilience of the air springs 26 and 28. As the axle moves upwardly, the wishbone assembly 38 and the axle seat assembly 30 secured thereto also moves upwardly with the radius rods 34 and 36 pivoting in a counterclockwise direction about the axes of the bushing assemblies. Since the radius rods 34 and 36 are generally parallel and of the same length, the pitch of the axle 22 remains constant during loading and unloading of the axle. This means that the pitch of the axle seat and wishbone assembly also remain constant in their coaction with the springs 26 and 28. The wishbone arrangement which extends from the axle mount and forward past the hanger assembly 32 provides a means by which the air springs can be mounted both fore and aft of the hanger assembly.

Referring to FIGS. 6 and 7, another embodiment 150 is shown. This embodiment differs from the first-described embodiment in the axle seat assembly 30 and wishbone assembly 38.

An axle mount bracket 152 extends from the top of the axle 22 to the bottom of the rear air spring 28. Reinforcing brackets 154 are welded to the top of the axle mount bracket. The wishbone brackets 132 and 134 have reinforcing brackets 156 in addition to the reinforcing webs 136. The wishbone assembly 38 is welded to the reinforcing brackets 154 at the top of the axle mount bracket 152 to secure the axle seat assembly 30 at the top. In addition, a torque link 158 is mounted to a hanger bracket 160 and wishbone bracket 132 to rigidly secure the two assemblies at the bottom. The torque link 158 also helps prevent the axle 22 from twisting loose from the axle seat assembly 30 when the brakes of the vehicle are applied.

A mounting bar 162 extends between the axle mount bracket 152 and a bottom axle seat bracket 164 and provides a mounting location for an air brake cylinder 166 which actuates a cam and shaft assembly 168. The cam and shaft assembly 168 for the vehicle brakes can also be located to the front of the axle 22 with very minor changes in the hardware assemblies. The double action shock absorber 40 extends between the wishbone bracket 134 and a chassis member 24 in this embodiment.

It should also be noted that the axle 22 is in a negative pitch in this embodiment as compared with the positive pitch in the first-described embodiment. Using either of these embodiments, the applicant's invention can be installed on vehicles requiring either negative or positive pitch axle mounts as specified by the manufacturer of the drive train.

The eccentric bushing assemblies 78 and 80 can be used to fine tune the pitch of the axle 22 once the suspension system 20 has been installed and also to adjust for minor changes experienced when the suspension system "wears in."

The operation of this embodiment is generally the same as with the first-described embodiment.

Figure 13:
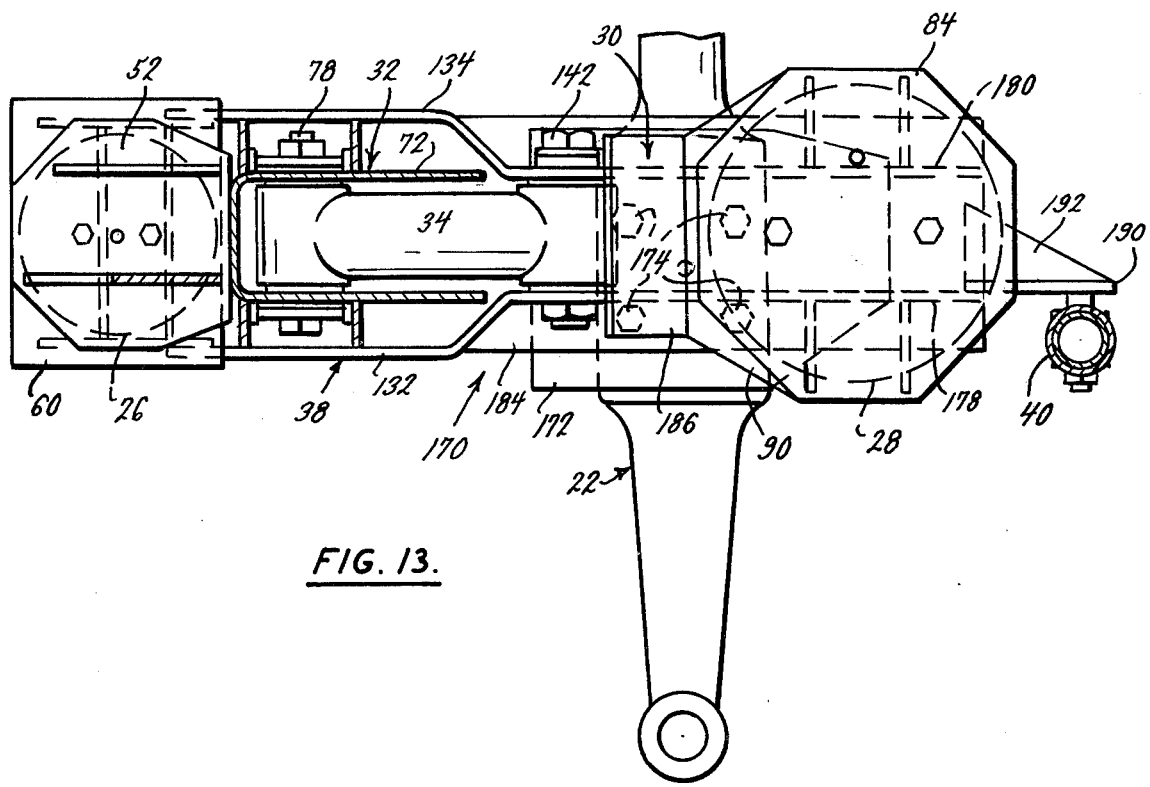
FIG. 13 is a top plan view of the embodiment of FIG. 12.
Figure 12:
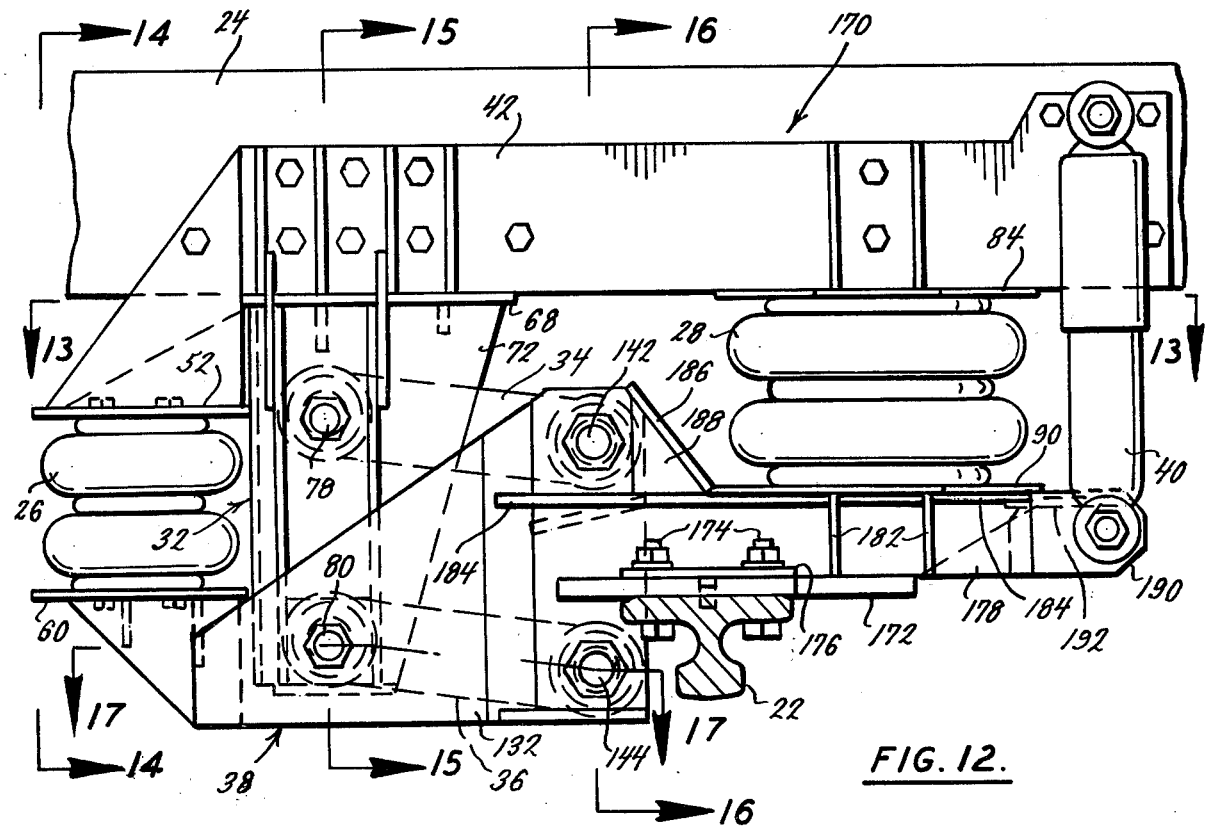
FIG. 12 is a side elevation view of another embodiment of this invention.
Figure 14:
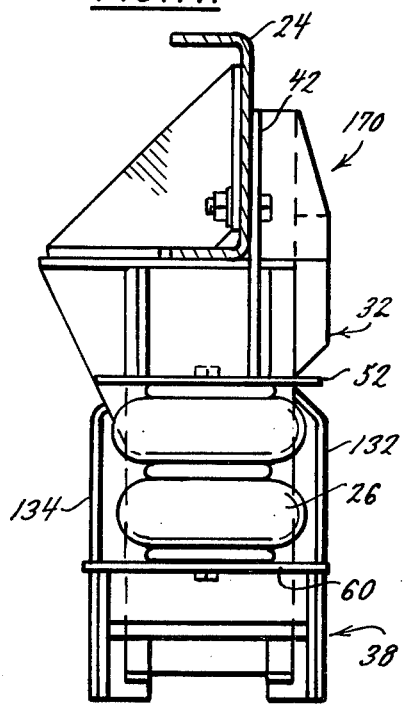
FIG. 14 is a front end view of the embodiment of FIG. 12 taken along the line 14—14 of FIG. 12.
Figure 15:
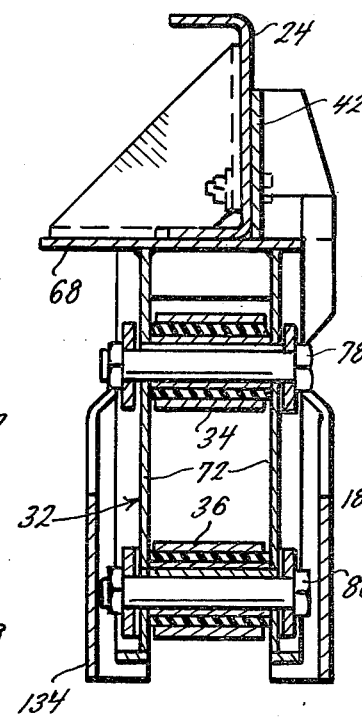
FIG. 15 is a section view taken along the line 15—15 of FIG. 12 detailing the hanger assembly.
Figure 16:
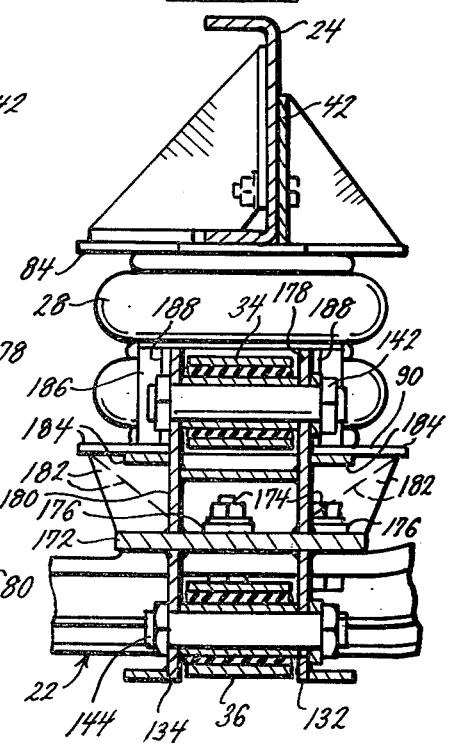
FIG. 16 is a section view taken along the line 16—16 of FIG. 12 and details the axle seat assembly.
Figure 17:
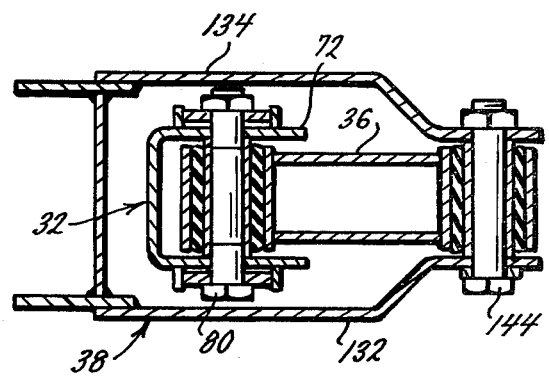
FIG. 17 is a section view taken along the line 17—17 of FIG. 12 and details the lower pull rod assembly.
Figure 18:
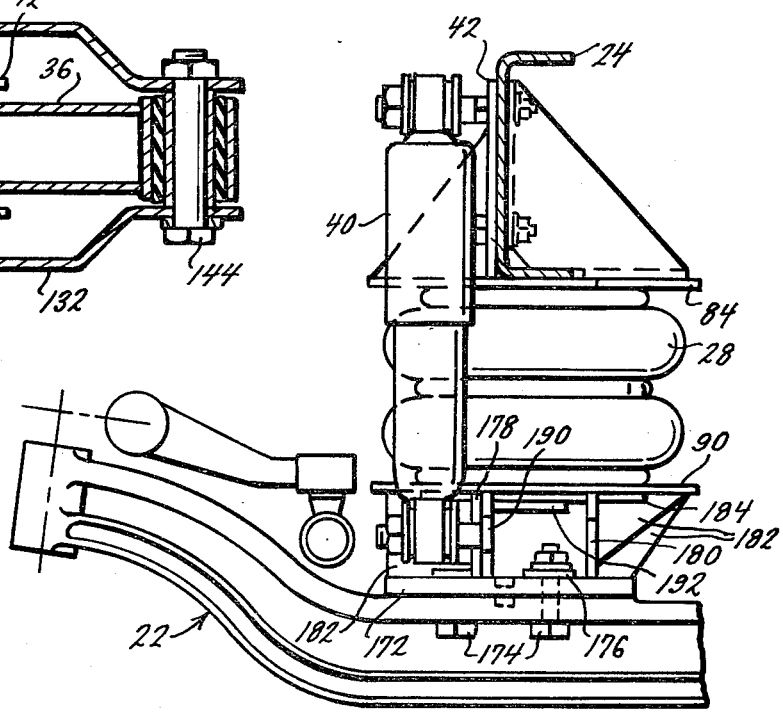
FIG. 18 is a rear end view of the embodiment of FIG. 12.

Referring to FIGS. 12 and 13, a further embodiment 170 is shown which is particularly adapted for use with a steering axle. It differs from the first-described embodiment in the axle seat assembly and mounting arrangement of the double action shock absorber 40. An axle mount bracket 172 is attached to the axle 22 by four bolt assemblies 174 and two mounting strips 176. Two axle seat beam brackets 178 and 180 extend upwardly from the axle mount bracket 172 and form a supproting beam for the rear one half of the suspension system 20. Reinforcing webs 182 extend between the beam brackets 178 and 180 and the bottom plate 90 of the rear air spring 28. Horizontal reinforcing brackets 184 are welded between the bottom plate 90 and the axle beam brackets 178 and 180 and extend the length of the beam brackets 178 and 180 to join with the wishbone brackets 132 and 134. A top plate 186 extends between the wishbone bracket 132 and 134 and the bottom plate 90 with side brackets 188 welded between the top plate 186 and the horizontal reinforcing bracket 184. A mounting tab 190 extends rearward from axle beam bracket 178 and is reinforced by plate 192 extending from the horizontal reinforcing bracket 184. Shock absorber 40 mounts between this mounting tab 190 and the chassis 24. As the loading of a steering axle is substantially different from the loading of the drive axle, the front and rear air springs 26 and 28 may be of slightly different design in this embodiment than in the others. However, the hanger assembly 32 and radius rods 34 and 36 as well as the wishbone bracket assembly 38 can all be substantially identical to that used in the other embodiments. The operation of this embodiment is generally the same as the first-described embodiment.

Figure 19:
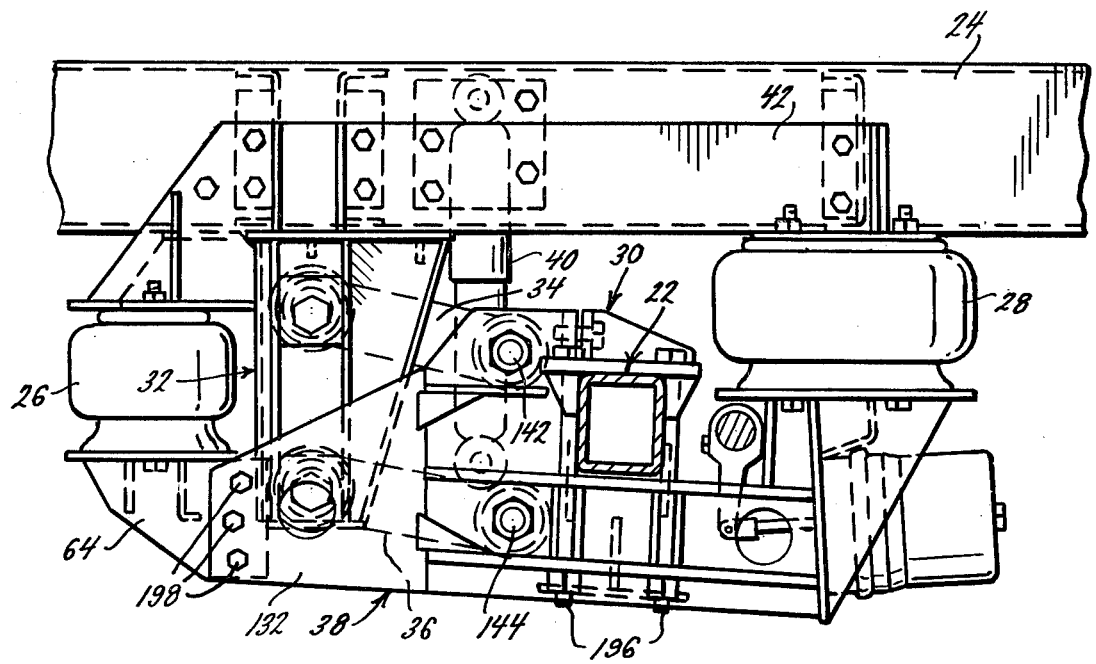
FIG. 19 is a side elevation view of a further embodiment of this invention.

Another embodiment is shown in FIG. 19, and is substantially similar to the first-described embodiment. The shock absorber 40 mounted between the wishbone bracket assembly 38 and the chassis 24 which eliminates the upward extension of the shock absorber 40 as shown in the first-described embodiment. Also, the axle bolts 196 extend the full height of the axle 22 and through the axle seat assembly 30 which gives extra strength to the assembly. The wishbone brackets 132 and 134 are bolted to the vertical bracket 64 with bolts 198. All the other basic components including the front and rear air springs 26 and 28, hanger assembly 32, and radius rods 34 and 36 are substantially identical, and operate as in the first-described embodiment.

Figure 20:
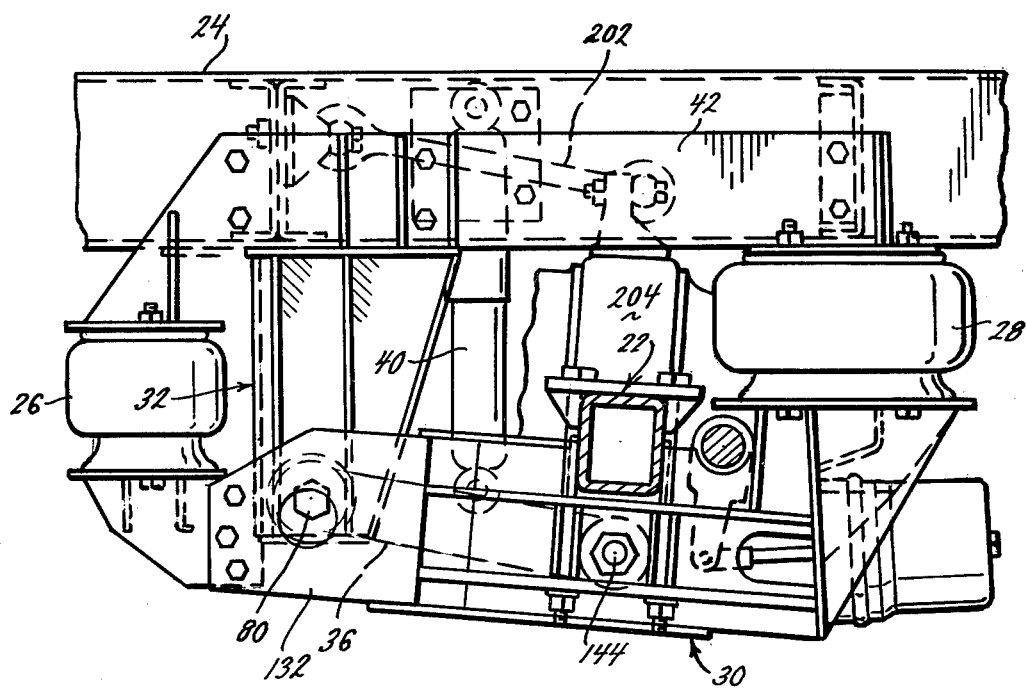
FIG. 20 is a side elevated view of still a further embodiment of this invention.

Another embodiment is shown in FIG. 20 and is similar to the last-described embodiment except that the upper radius rod 34 is eliminated and a radius rod 202 replaces it. The radius rod 202 is pivotally connected between the differential 204 of the axle 22 and the chassis 24. This embodiment may be used where the vehicle to which the suspension is mounted already includes a central radius rod. To preserve the parallelogram stabilizing of the axle 22, the lower radius rod 36 has been lengthened and the bushing 144 has been moved from the wishbone bracket 132 to a position just under the axle 22. By enlarging the parallelogram, a better stabilized and smoother ride can be obtained.

Various changes and modifications may be made in this invention, as will be readily apparent to those skilled in the art. Such changes and modifications are within the scope and teaching of this invention as defined by the claims appended hereto.

What is claimed is:

1. A suspension assembly for a vehicle for mounting the vehicle chassis to a vehicle axle, comprising a hanger depending from the chassis and rigidly supported thereto to form a member thereof, a beam extending generally in the fore and aft direction, means for rigidly mounting said axle to said beam to define an axle and beam assembly, said beam comprising a wishbone having members extending generally from said axle and past said hanger on both the inboard and outboard sides of said hanger, said beam members moving generally up and down relative to said hanger during loading and unloading of the axle, spring means mounted forwardly and rearwardly of said hanger between said beam and said chassis for resiliently resisting movement of the axle and beam assembly during loading and unloading of the axle, and parallelogram means connected between said chassis and said axle and beam assembly for maintaining the pitch of the axle and beam assembly constant during loading and unloading of the axle.

2. The assembly of claim 1 wherein said spring means further comprises air springs mounted forwardly and rearwardly of said hanger.

3. The assembly of claim 2 wherein said parallelogram means further comprises at least one rod having one end pivotally mounted to said hanger and the other end pivotally mounted to said axle and beam assembly.

4. The assembly of claim 3 wherein said parallelogram means further comprises another rod generally parallel to and approximately the same length as said at least one rod, said other rod having one end pivotally mounted to a chassis member and its other end pivotally mounted to said axle and beam assembly.

5. The assembly of claim 4 wherein said other rod is pivotally mounted at its one end to said hanger assembly.

6. The assembly of claim 4 wherein said axle is located rearwardly of said hanger, and said rods extend rearwardly from said chassis member toward said axle.

7. The assembly of claim 1 further comprising means associated with the pivotal mounting means of said rods for adjusting axle pitch and axle alignment.

8. A vehicle suspension for mounting a vehicle chassis to a vehicle axle comprising a hanger depending from said chassis and being rigidly attached thereto and forming a member thereof, a beam extending generally in the fore and aft direction from a location rearwardly of said hanger, forwardly past said hanger on at least one side of said hanger, and to a location forwardly of the hanger, means for rigidly mounting the axle to said beam at a location rearwardly of said hanger, said axle and beam defining an axle and beam assembly, at least one air spring mounted between said beam and said chassis at a location rearwardly of said axle, and at least one air spring mounted between said beam and said chassis at a location forwardly of said hanger, and parallelogram means mounted between said chassis and said axle and beam assembly for stabilizing said axle and beam assembly and maintaining the pitch of said axle and beam assembly constant during loading and unloading of the axle, said parallelogram means further comprising at least two rods which are generally parallel and approximately equal in length, each of said rods having its forward end pivotally connected to a chassis member, and its rearward end pivotally connected to said axle and beam assembly.

9. The assembly of claim 8 wherein said beam further comprises members extending generally from said axle forwardly past said hanger on both the inboard and outboard sides of said hanger such that said hanger is located between said members and such that said beam moves generally up and down relative to said hanger during loading and unloading of the axle.

10. The assembly of claim 9 wherein at least one of the pull rods has its forward end pivotally mounted to said hanger and its rearward end pivotally mounted to said beam.

11. The assembly of claim 10 wherein a second pull rod has its forward end pivotally mounted to said hanger and its rearward end pivotally mounted to said beam, said pull rods being spaced apart vertically.

12. The assembly of claim 10 wherein at least one pull rod has its forward end pivotally mounted to another chassis member, and its rearward end pivotally mounted to the axle.

13. The assembly of claim 8 wherein said pivotally mounting means for said pull rods include means to adjust axle pitch and axle alignment.

14. A suspension assembly for a vehicle for mounting the vehicle chassis to a vehicle axle, comprising a hanger depending from the chassis and rigidly supported thereto to form a member thereof, a beam extending generally in the fore and aft direction from a location rearwardly of said hanger, forwardly past said hanger on at least one side of said hanger, and to a location forwardly of the hanger, means for rigidly mounting said axle to said beam to define an axle and beam assembly, spring means mounted forwardly and rearwardly of the hanger between said beam and said chassis for resiliently resisting movement of the axle and beam assembly during loading and unloading of the axle, and parallelogram means connected between said chassis and said axle and beam assembly for maintaining the pitch of the axle and beam assembly constant during loading and unloading of the axle.

15. The assembly of claim 14 wherein said beam further comprises members extending generally from said axle forwardly past said hanger on both the inboard and outboard sides of said hanger such that said hanger is located between said members and such that said beam moves generally up and down relative to said hanger during loading and unloading of the axle.

16. The assembly of claim 15 wherein said parallelogram means further comprises at least two generally parallel rods of approximately the same length, each rod having one end pivotally mounted to said hanger and its other end pivotally mounted to said axle and beam assembly.

17. A unitized suspension assembly for a vehicle for mounting the vehicle chassis to a vehicle axle comprising a hanger depending from the chassis, a beam extending generally in the fore and aft direction, means for rigidly mounting said axle to said beam to define an axle and beam assembly, said beam comprising a wishbone having members extending generally from said axle and past said hanger on at least one side of said hanger, said beam members moving generally up and down relative to said hanger during loading and unloading of the axle, spring means mounted forwardly and rearwardly of said hanger between said beam and said chassis for resiliently resisting movement of the axle and beam assembly during loading and unloading of the axle, and parallelogram means connected between said hanger and said axle and beam assembly for maintaining the pitch of the axle and beam assembly constant during loading and unloading of the axle.

* * * * *